(12) United States Patent
Nishio

(10) Patent No.: US 9,490,602 B2
(45) Date of Patent: Nov. 8, 2016

(54) LASER SYSTEM ABLE TO ESTIMATE HERMETIC SEAL OF LASER GAS CONTAINER

(71) Applicant: FANUC CORPORATION, Minamitsuru-gun, Yamanashi (JP)

(72) Inventor: Akihiko Nishio, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 311 days.

(21) Appl. No.: 14/196,608

(22) Filed: Mar. 4, 2014

(65) Prior Publication Data

US 2016/0141823 A1    May 19, 2016

(30) Foreign Application Priority Data

Mar. 5, 2013    (JP) ................. 2013-042953

(51) Int. Cl.
*H01S 3/00* (2006.01)
*H01S 3/036* (2006.01)

(52) U.S. Cl.
CPC ............. *H01S 3/0014* (2013.01); *H01S 3/036* (2013.01)

(58) Field of Classification Search
CPC ......... H01S 3/0014; H01S 3/036; H01S 3/03
See application file for complete search history.

(56) References Cited

U.S. PATENT DOCUMENTS

| | | | |
|---|---|---|---|
| 6,721,344 B2* | 4/2004 | Nakao ................... | H01S 3/2366 372/32 |
| 2008/0043799 A1 | 2/2008 | Egawa | |
| 2008/0304533 A1 | 12/2008 | Ando | |
| 2009/0116521 A1 | 5/2009 | Ando | |
| 2011/0243177 A1* | 10/2011 | Nishio ................... | H01S 3/036 372/58 |
| 2012/0006798 A1* | 1/2012 | Eguchi ................... | H01S 3/036 219/121.67 |
| 2013/0315274 A1 | 11/2013 | Murakami | |

FOREIGN PATENT DOCUMENTS

| | | |
|---|---|---|
| CN | 1837766 | 9/2006 |
| CN | 101325305 | 12/2008 |
| DE | 102011012821 | 10/2011 |
| EP | 1816712 | 8/2007 |
| JP | 02-142558 | 12/1990 |
| JP | 07-176816 | 7/1995 |
| JP | 2561510 | 1/1998 |
| JP | 10-065242 | 3/1998 |
| JP | 11-008426 | 1/1999 |
| JP | 2011187526 | 9/2011 |
| JP | 2011228624 | 11/2011 |

* cited by examiner

*Primary Examiner* — Dung Nguyen
(74) *Attorney, Agent, or Firm* — RatnerPrestia

(57) ABSTRACT

A laser system including a pressure adjusting part adjusting the laser gas pressure in the laser gas container, a pressure control unit controlling the pressure adjusting part so that before startup of the laser oscillator, the laser gas pressure becomes a first gas pressure lower than atmospheric pressure and so that at a preparatory stage after startup of the laser oscillator and before radiation of the laser light, the laser gas pressure becomes a second gas pressure capable of oscillating laser light, a laser control unit controlling the laser oscillator so that the laser oscillator executes an initial operation, a laser detector detecting the laser light output by the initial operation, and a hermetic seal estimating part estimating an extent of hermetic seal of the laser gas container based on a detection value obtained by the laser detector.

12 Claims, 15 Drawing Sheets

LASER SYSTEM ABLE TO ESTIMATE HERMETIC SEAL OF LASER GAS CONTAINER

BACKGROUND OF THE INVENTION

1. Field of the Invention

The present invention relates to a laser system which can estimate the hermetic seal of a laser gas container in which a laser gas is sealed.

2. Description of the Related Art

In the past, a laser system has been known, which measures the pressure before turning off the power of the laser system, stores it in the memory, and compares this stored gas pressure with gas pressure which is measured when the power of the laser system is turned on so as to detect gas leakage of the laser gas container. As this type of system, for example, the system which is described in Japanese Utility Model Registration No. 2561510Y (JP2561510Y) also measures the gas temperature when measuring the gas pressure, converts the measured gas pressure to a pressure at a reference temperature, and uses the converted value to detect gas leakage.

However, the system described in JP2561510Y does not detect gas leakage in a state where gas leakage easily occurs. It is hard for it to detect gas leakage easily and accurately.

SUMMARY OF THE INVENTION

In one aspect of the present invention, the laser system includes a laser gas container forming a gas channel in which laser gas circulates, a laser oscillator oscillating laser light by using laser gas flowing through the gas channel as an excitation medium, a gas pressure detector detecting a laser gas pressure in the laser gas container, a pressure adjusting part adjusting the laser gas pressure in the laser gas container based on a value detected by the gas pressure detector, a pressure control unit controlling the pressure adjusting part so that before startup of the laser oscillator, the laser gas pressure in the laser gas container becomes a first gas pressure lower than atmospheric pressure and so that at a preparatory stage after startup of the laser oscillator and before laser light is radiated to an outside, the laser gas pressure in the laser gas container becomes a second gas pressure capable of oscillating laser light, a laser control unit controlling the laser oscillator so that the laser oscillator executes an initial operation in which the laser oscillator outputs laser light in accordance with a predetermined oscillation condition at the preparatory stage, a laser detector detecting the laser light output by the initial operation of the laser oscillator or a physical quantity having a correlative relationship with the laser light output by the initial operation of the laser oscillator, and a hermetic seal estimating part estimating an extent of hermetic seal of the laser gas container based on a detection value obtained by the laser detector.

BRIEF DESCRIPTION OF THE DRAWINGS

The objects, features, and advantages of the present invention will become clearer from the following description of embodiments in relation to the attached drawings, in which.

DETAILED DESCRIPTION

First Embodiment

Figure 1:
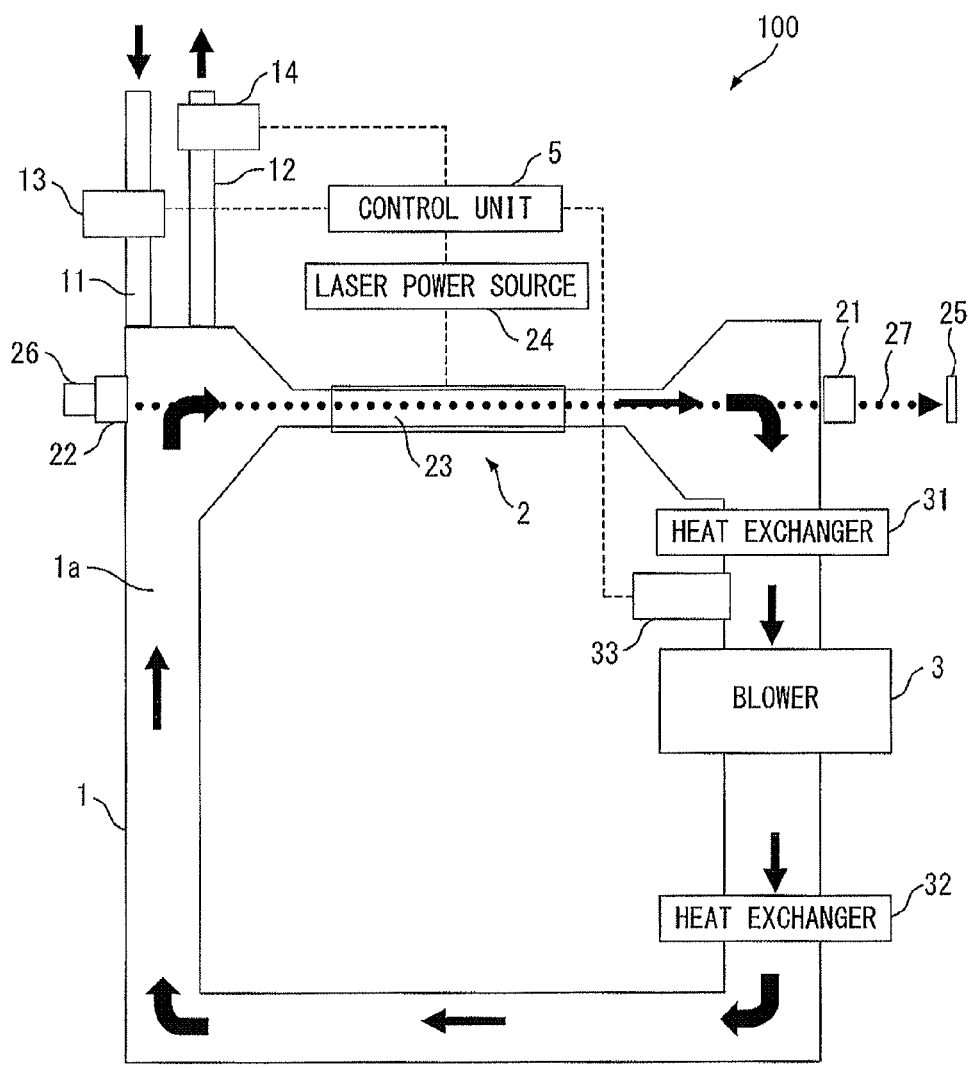
FIG. 1 is a view which schematically shows the configuration of a laser system according to a first embodiment of the present invention.

Below, referring to FIG. 1 to FIG. 5, a first embodiment of the present invention will be explained. FIG. 1 is a view which schematically shows a laser system 100 according to the first embodiment of the present invention. This laser system 100 is provided with a laser gas container 1 which forms a gas channel 1a through which laser gas circulates, a laser oscillator 2 and blower 3 which are arranged on the gas channel 1a, and a control unit 5 which controls the laser oscillator 2 and blower 3. The laser system 100 according to the present embodiment can be used in a broad range of fields such as processing, medicine, and measurement.

The laser gas container 1 is a hermetically sealed vacuum container. Inside the laser gas container 1, a predetermined laser gas is sealed in a state cut off from the air. As the laser gas, media gas for laser oscillation use which includes carbon dioxide gas, nitrogen gas, argon gas, or another laser media gas is used.

The laser oscillator 2 has an output mirror 21, rear mirror 22, and discharge tube 23 which is arranged between the output mirror 21 and the rear mirror 22. The discharge tube 23 communicates with the gas channel 1a. The discharge tube 23 is supplied with power from the laser power source 24. When supplied with power from the laser power source 24, the laser gas is excited while passing through the discharge tube 23 and becomes a laser active state. The light generated by the discharge tube 23 is amplified between the output mirror 21 and rear mirror 22 to oscillate whereby laser light is generated.

The output mirror 21 is a partial transparent mirror. Laser light which passes through the output mirror 21 becomes output laser light 27, and then is output to the outside. This laser light 27 passes through an openable and closable shutter 25 and is radiated toward an object. At the side of the rear mirror 22, a laser detector 26 which detects the output of the laser light 27 which passes through the rear mirror 22 is provided. The laser detector 26 can be configured by photodiode, thermopile, etc.

The blower 3 is comprised of a fan or blower which is driven by an electric motor. The blower 3 is supplied with power through a not shown blower inverter. Due to this power, the blower 3 operates and makes the laser gas circulate along the gas channel 1a. At the gas channel 1 at the upstream side and downstream side of the blower 3, a first heat exchanger 31 and a second heat exchanger 32 are arranged. At the heat exchangers 31 and 32, a predetermined refrigerant (for example cooling water) flows. The laser gas is cooled by heat exchange with this refrigerant while passing through the heat exchangers 31 and 32 and thereby held at a predetermined temperature.

A gas feed channel 11 for feeding laser gas to the gas channel 1a and a gas exhaust channel 12 for exhausting laser gas from the gas channel 1a communicate with the gas channel 1a. At the gas feed channel 11, a feed device 13 is provided. Through the feed device 13, laser gas is supplied from a high pressure tank (not shown) in which the laser gas is stored to the inside of the gas channel 1a. At the gas exhaust channel 12, an exhaust device 14 is provided. Laser gas is exhausted through the exhaust device 14 from the gas channel 1a. The feed device 13 and exhaust device 14 are configured including shutoff valves.

At the time of laser oscillation, laser gas is continuously fed through the gas feed channel 11 and gas exhaust channel 12 to the gas channel 1a whereby fine amounts of the laser gas in the laser gas container 1 are replaced. At the downstream side of the first heat exchanger 31 and the upstream side of the blower 30, a gas pressure detector 33 is provided. The gas pressure inside the laser gas container 1 is detected by the gas pressure detector 33.

In the above configured laser system 100, the laser gas container 1 is sealed. However, degradation of the O-rings or other seal members or looseness of the joints, etc. lead to leakage of laser gas from the laser gas container 1 or entry of air into the laser gas container 1, and thus the quality of the laser gas may be deteriorated. If the laser gas deteriorates in quality, the desired laser output cannot be obtained, so it is preferable to obtain a grasp of the extent of the hermetic seal of the laser gas container 1 before radiating the laser. Therefore, in the present embodiment, at the time of shutdown and the time of startup of the laser oscillator 2, the control unit 5 executes the following processing to estimate the extent of the hermetic seal.

"the time of startup of the laser oscillator 2" corresponds to the period from the start of startup of the laser oscillator 2 to the completion of startup, that is, the preparatory stage from when the power of the laser oscillator 2 is turned on to when radiating the laser is commanded. At the time of startup of the laser oscillator 2, the shutter 25 is closed and the laser is not radiated to the outside.

Figure 2:
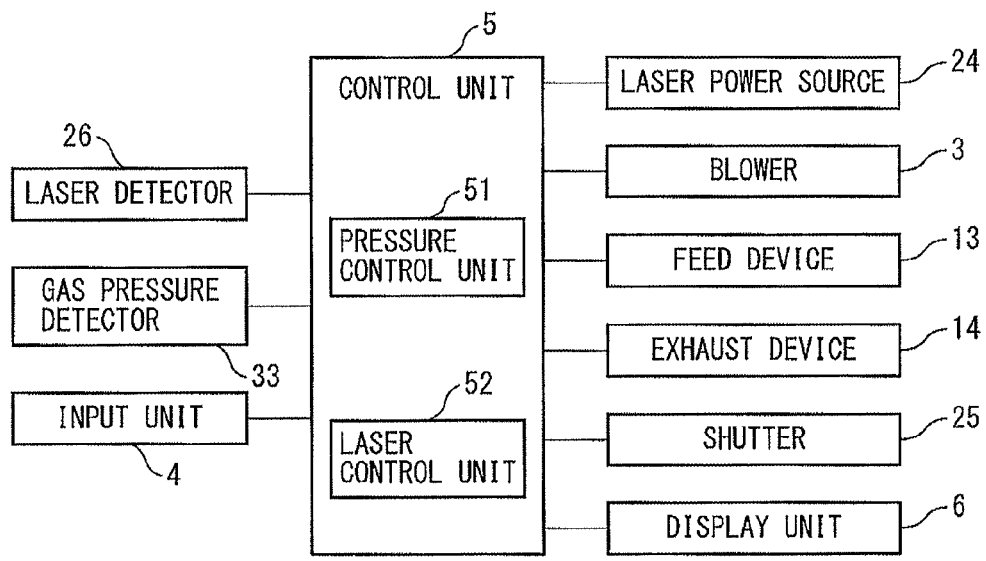
FIG. 2 is a block diagram which shows part of a control configuration of a laser system according to a first embodiment of the present invention.

FIG. 2 is a block diagram which shows part of the control configuration of the laser system 100 according to the first embodiment of the present invention. The control unit 5 is comprised of a processing system which has an CPU, ROM, RAM, and other peripheral circuits, etc. The control unit 5 has a pressure control unit 51 which controls the pressure inside of the laser gas container 1 and a power control unit (laser control unit 52) which controls the power which is supplied from the laser power source 24 to the laser oscillator 2. The control unit 5 executes processing to shut down the laser oscillator 2 (oscillator shutdown processing) and processing to start up the laser oscillator 2 (oscillator startup processing).

The control unit 5 receives as input signals from the laser detector 26, gas pressure detector 33, and input part 4 through which the user inputs various commands. The control unit 5 outputs control signals to the laser power source 24, blower 3 (blower inverter), feed device 13, exhaust device 14, shutter 25, and display unit 6 and controls their operations.

Figure 3:
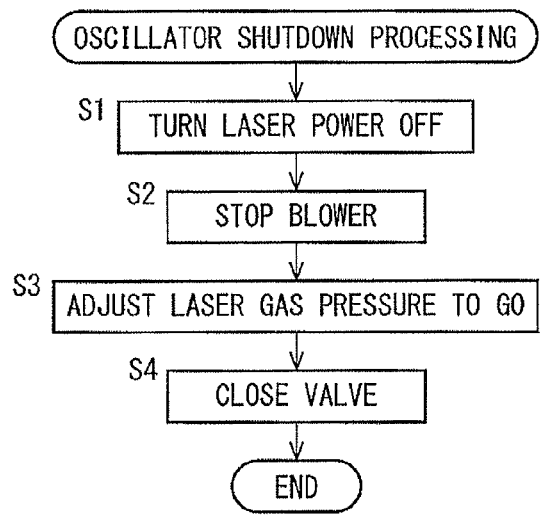
FIG. 3 is a flowchart which shows one example of oscillator shutdown processing executed by a control unit of FIG. 2.

FIG. 3 is a flowchart which shows an example of the oscillator shutdown processing. The processing which is shown in this flowchart is, for example, started when shutdown of the laser oscillator 2 is instructed through the input part 4. At step S1, the power of the laser oscillator 2 (laser power source 24) is turned off. At step S2, the rotation of the blower 3 is stopped. Due to this, circulation of the laser gas in the laser gas container 1 is stopped.

At step S3, the gas pressure inside of the laser gas container 1 is adjusted so that the gas pressure which is detected by the gas pressure detector 33 becomes a predetermined gas pressure G0 (target gas pressure) which is lower than the atmospheric pressure around the laser system 100. This adjustment is performed by controlling the feed device 13 and exhaust device 14 to feed and exhaust laser gas to and from the laser gas container. At step S4, the shutoff valve of the feed device 13, the shutoff valve of the exhaust device 14, and all other valves which are connected to the gas laser container 1 are closed. Due to this, the laser gas container 1 is rendered a hermetically sealed state. With the above, the oscillator shutdown processing is ended.

When the gas pressure during laser oscillation (gas pressure in case assuming laser gas is not circulating) is controlled to a predetermined gas pressure Ga which is lower than atmospheric pressure, the target gas pressure G0 of step S3 may be set to this gas pressure Ga. Due to this, by just closing the shutoff valves of the feed device 13 and exhaust device 14 and cutting off the flow of laser gas (step S4), the gas pressure can be adjusted to the target gas pressure G0.

The target gas pressure G0 need only be lower than atmospheric pressure. For example, the target gas pressure G0 can also be set to a value which is higher than the gas pressure Gas during laser oscillation. In this case, it is sufficient to fill laser gas inside the laser gas container 1 to adjust it to the target gas pressure G0. On the other hand, when the gas pressure Ga during laser oscillation is higher than atmospheric pressure, it is possible to exhaust laser gas from inside the laser gas container 1 to adjust the gas pressure P to the target gas pressure G0. It is also possible to adjust the gas pressure at step S3 after stopping the blower 3, then waiting until the gas pressure stabilizes. After the oscillator shutdown processing, the laser gas container 1 is held in a hermetically sealed state and laser gas is not fed or exhausted inside the laser gas container 1. Therefore, compared with feeding and exhausting laser gas as required, it is possible to suppress the amount of consumption of laser gas.

After the oscillator startup processing ends, the laser gas container 1 is left uncontrolled in the hermetically sealed state. At this time, the gas pressure in the hermetically sealed state is made lower than atmospheric pressure, so when there is a problem in the seal of the laser gas container 1, air enters the laser gas container 1. Due to this, the quality of the laser gas deteriorates and the laser output falls. Considering this point, in the following oscillator startup processing, at the time of startup of the laser oscillator 2, the extent of the hermetic seal of the laser gas container 1 is estimated in accordance with the magnitude of the laser output. The lower the target gas pressure G0 is made compared with atmospheric pressure, the more easy it is for air to enter the laser gas container 1 and the more easy it is to estimate the hermetic seal.

Figure 4:
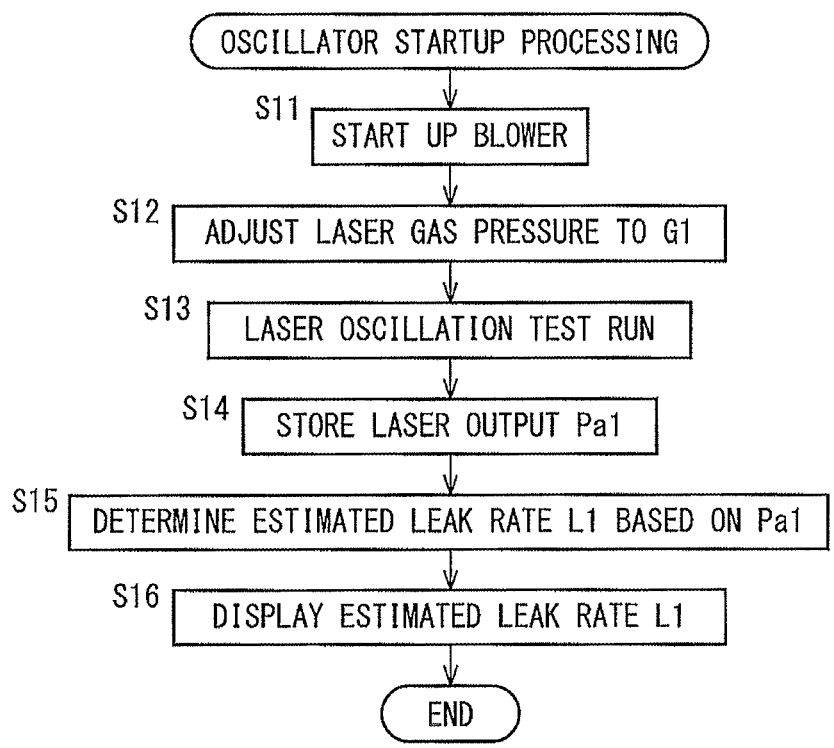
FIG. 4 is a flowchart which shows one example of oscillator startup processing executed by a control unit of FIG. 2.

FIG. 4 is a flowchart which shows an example of oscillator startup processing. For example, if a command is given through the input part 4 to turn on the power of the laser oscillator 2 (laser power source 24), the laser power source 24 turns on, startup of the laser oscillator 2 becomes possible, and the routine of FIG. 4 is started.

At step S11, a control signal is output to the blower 3 and the blower 3 is started up. Due to this, the laser gas circulates through the inside of the laser gas container 1. At step S12, the gas pressure which is detected by the gas pressure detector 33 is made to become a predetermined gas pressure G1 by adjusting the gas pressure inside of the laser gas container 1. This adjustment is performed by controlling the feed device 13 and exhaust device 14 to supply and discharge laser gas to and from the laser gas container 1. The gas pressure G1 is the optimum gas pressure for laser oscillation (gas pressure when radiating laser) and, for example, is higher than the target gas pressure G0.

At step S13, a control signal is output to the laser power source 24 and laser light is output from the laser oscillator 2 in accordance with a predetermined oscillation condition. That is, in an initial operation of the laser oscillator 2, the laser oscillation is performed on a test basis (laser oscillation test run). For example, a laser oscillation test run by the laser output command P1 (W) and the duty command D1 (%) as pulse commands is performed for exactly T1 seconds. At this time, the output of the laser light which is generated by the laser oscillation test run is detected by the laser detector 26. At step S14, a representative value Pa1 of the laser output detected by the laser detector 26 is stored in the memory. For example, the average value of the laser outputs which are detected during a predetermined time T1 or the value of the laser output which is detected at the end (after T1 seconds) is stored as the representative value Pa1.

At step S15, this laser output value Pa1 (hereinafter, sometimes called "laser output Pa1") is used as the basis to estimate the extent of hermetic seal of the laser gas container 1. If defining the pressure change inside the laser gas container 1 per unit time as the estimated leak rate L1 (unit: Pa/hour), there is a predetermined correlative relationship between the laser output value Pa1 and the estimated leak rate L1. That is, the state of a large estimated leak rate L1 is the state where air enters the laser gas container 1 and the quality of the laser gas deteriorates. If the estimated leak rate L1 becomes larger, the ratio of impurities in the laser gas increases and the laser output value Pa1 becomes smaller. Therefore, the relationship between the laser output value Pa1 and the estimated leak rate L1, that is, the relationship of the estimated leak rate L1 decreasing along with the increase of the laser output value Pa1, is determined in advance by experiments, etc. and stored in the memory. At step S15, this relationship is used to determine the estimated leak rate L1. Due to this, it is possible to estimate the extent of hermetic seal of the laser gas container 1.

At step S16, a control signal is output to the display unit 6, and the estimated leak rate L1 corresponding to the laser output value Pa1 is displayed. Due to this, the user can easily obtain a grasp of the extent of hermetic seal of the laser gas container 1. With the above, the oscillator startup processing is ended. At the stage where the oscillator startup processing ends, the startup of the laser oscillator 2 completes and is rendered a state able to receive a laser radiation command. In this state, when the laser radiation is commanded through the input part 4, the shutter 25 is opened and laser light is radiated.

In this way, in the first embodiment, when the laser oscillator 2 is shut down, the gas pressure inside of the laser gas container 1 is adjusted to the target gas pressure G0 which is larger than atmospheric pressure (step S3). When the laser oscillator 2 is started up, the gas pressure inside the laser gas container 1 is adjusted to the gas pressure G1 suitable for radiating the laser (step S12). Furthermore, the laser oscillator 2 is made to oscillate laser light on a test basis under the predetermined oscillation condition (step S13), the estimated leak rate L1 is determined from the laser output value Pa1 which is obtained by the laser oscillation test run (step S15), and the rate is displayed on the display unit 6 (step S16).

Due to this, since detecting leakage in a state where leakage of laser gas easily occurs, the user can easily and accurately obtain a grasp of the extent of hermetic seal of the laser gas container 1. Further, since detecting leakage while actually operating the laser oscillator 2, it is possible to precisely estimate the extent of hermetic seal of the laser gas container 1. Furthermore, at the time of detection of leakage, the gas temperature is not measured, so the laser system 100 does not have to be provided with a temperature detector and a rise in price of the laser system 100 can be suppressed.

Figure 5:
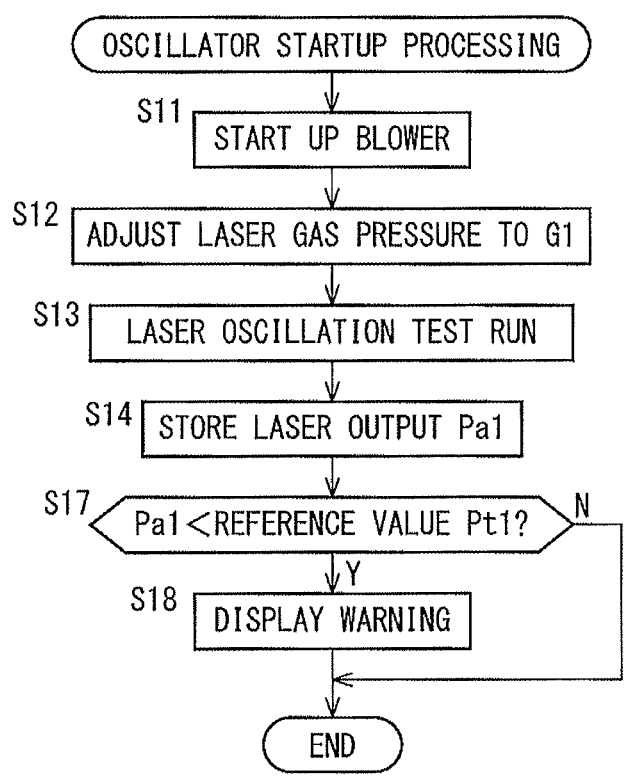
FIG. 5 is a flow chart which shows a modification of FIG. 4.

FIG. 5 is a flow chart which shows a modification of FIG. 4. The same portions as shown in FIG. 4 are assigned the same reference notations. In FIG. 5, at step S14, the laser output Pa1 after the laser oscillation test run is stored in a memory, then the routine proceeds to step S17. At step S17, it is judged if this laser output Pa1 is smaller than a predetermined reference value Pt1. The reference value Pt1 is the threshold value for judging the quality of the hermetic seal and is set to a value which becomes a reference for whether replacement of a seal member or other maintenance is required.

If the positive decision is made at step S17, the routine proceeds to step S18, while if the negative decision is made, the routine bypasses step S18 and ends the processing. At step S18, it outputs a control signal to the display unit 6 and displays a warning to indicate the effect that the hermetic seal is poor. Due to this, the user can judge the quality of the hermetic seal of the laser gas container 1. In the example of FIG. 5, a warning is displayed only when the hermetic seal is poor, that is, when there is an effect on the laser output which might become a problem, so it is possible to easily judge the quality of the hermetic seal.

Second Embodiment

Figure 6:
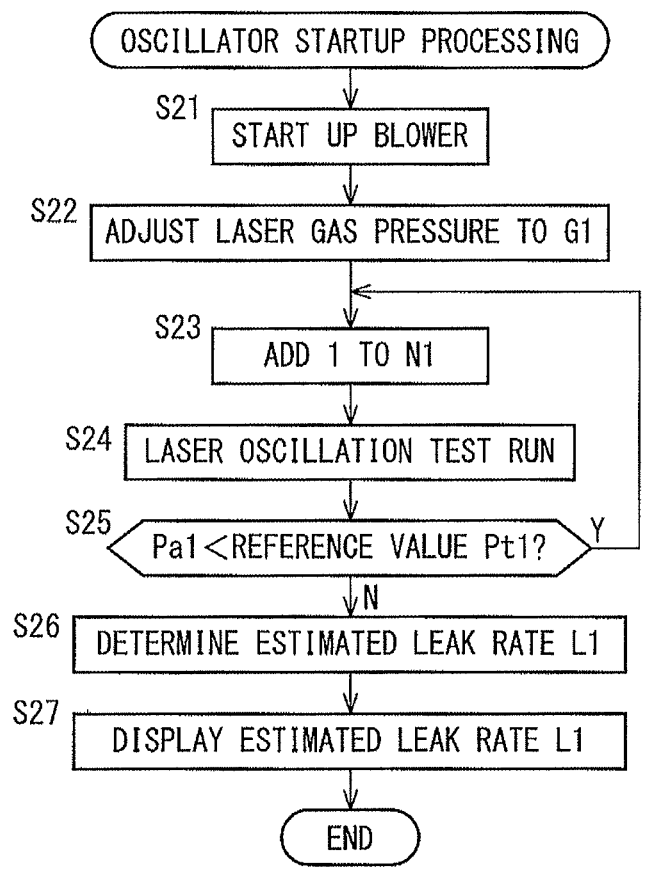
FIG. 6 is a flowchart which shows one example of oscillator startup processing which is executed by a control unit of a laser system according to a second embodiment of the present invention.
Figure 7:
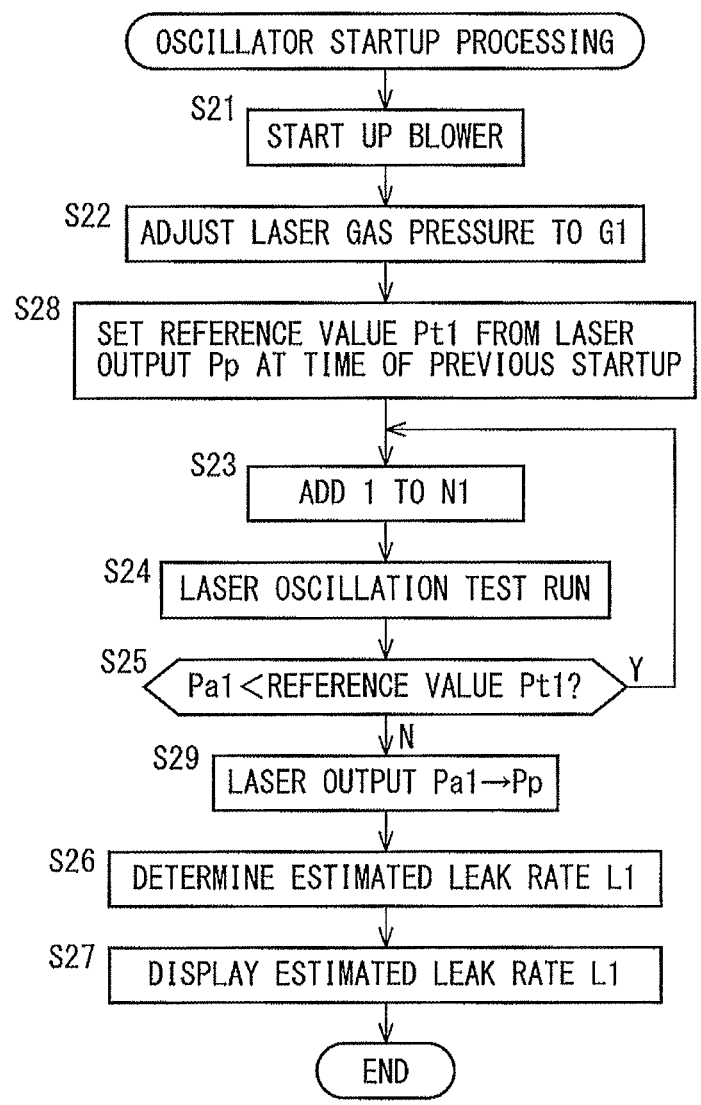
FIG. 7 is a flow chart which shows a modification of FIG. 6.

Referring to FIG. 6 and FIG. 7, a second embodiment of the present invention will be explained. Below, the points of difference from the first embodiment will mainly be explained. The second embodiment differs from the first embodiment in the oscillator startup processing in the control unit 5. Before the oscillator startup processing, oscillator shutdown processing similar to the first embodiment is performed.

FIG. 6 is a flowchart which shows an example of the oscillator startup processing which is executed by the control unit 5 of the second embodiment. In the figure, the processing of step S21 and step S22 is the same as the processing of step S11 and step S12 of FIG. 4. That is, at step S21, the blower 3 is started up, while at step S22, the laser gas pressure is adjusted to the optimal gas pressure G1 for laser oscillation. At step S23, the number N1 of times of execution of the laser oscillation test run is incremented by exactly "1" and stored in the memory. N1 is set to 0 in the initial state. At step S24, in the same way as step S13 of FIG. 4, a predetermined laser oscillation test run (laser output command P1 and duty command D1 as pulse commands) is executed for exactly a predetermined time T1.

Next, at step S25, it is judged if the laser output Pa1 is smaller than the predetermined reference value Pt1. The reference value Pt1 is, for example, set to the equivalent of the laser output when the laser is radiated in the normal state where the laser gas is not contaminated by impurities. If the positive decision is made at step S25, the routine returns to step S23. Due to this, the laser oscillation test run is repeated until the laser output Pa1 reaches the reference value Pt2, and the number of times the laser oscillation test run is executed is counted. If the laser gas contains impurities, the initial laser output Pa1 is small. However, the laser output Pa1 rises each time repeating the laser oscillation test run. If the laser output Pa1 reaches the reference value Pt1, the negative decision is made at step S25 and the routine proceeds to step S26.

At step S26, the number N1 of times of execution of the laser oscillation test run is used to estimate the extent of hermetic seal of the laser gas container 1. Between the number N1 of times of execution and the estimated leak rate L1, there is a predetermined correlative relationship that the larger the number N1 of times of execution, the larger the estimated leak rate L1. This relationship is determined in advance by experiments, etc. and stored in the memory. At step S26, the estimated leak rate L1 corresponding to the number N1 of times of execution is determined from this relationship. At step S27, in the same way as step S16 of FIG. 4, the estimated leak rate L1 is displayed on the display unit 6 and the oscillator startup processing is ended.

In this way, in the second embodiment, the oscillator shutdown processing is used to adjust the gas pressure inside of the laser gas container 1 to a gas pressure G0 lower than atmospheric pressure, then the oscillator startup processing is used to repeat the laser oscillation test run until the laser output Pa1 reaches the reference value Pt1 (step S23 to step S25) and the estimated leak rate L1 is determined from the number N1 of times of execution of the laser oscillation test run (step S26).

Due to this, in the same way as the first embodiment, the user can easily and accurately obtain a grasp of the extent of the hermetic seal of the laser gas container 1 and the rise in price of the laser system 100 can be kept down. Further, when the oscillator startup processing is completed, the laser output Pa1 becomes the reference value Pt1 or more, so the laser output is stable and good laser light can be emitted immediately when the laser radiation is commanded. Instead of displaying the estimated leak rate L1, in the same way as FIG. 5, it is also possible to judge the quality of the hermetic seal of the laser gas container 1. In this case, instead of step S26 and step S27, it is judged if the number N1 of times of execution of the laser oscillation test run is the predetermined number Nt of times used as the reference for judgment of quality or more. If N1 is equal to or more than Nt, a warning may be displayed.

FIG. 7 is a flow chart which shows a modification of FIG. 6. The same portions as shown in FIG. 6 are assigned the same reference notations. In FIG. 7, the laser output Pa1 at the time of end of the laser oscillation test run at the previous oscillator startup processing is used to set the reference value Pt (reference value Pt1 of FIG. 6). That is, at step S29, the laser output Pa1 when the laser oscillation test run is repeated and the laser output reaches the reference value Pt1 is stored in the memory as the laser output Pp at the time of the previous oscillation startup processing. At step S28, this laser output Pp is used to set the reference value Pt1 at the time of the current oscillation startup processing. For example, Pp multiplied with a predetermined coefficient (for example 0.9) is set as the reference value Pt1. At step S25, the relative magnitude of the reference value Pt1 and the laser output Pa1 is judged.

In FIG. 7, the actual laser output Pa1 (Pp) obtained by the laser oscillation test run is used to set the reference value Pt1 of the laser oscillation test run in the next oscillator startup processing, so even if there is variation in the characteristics for each laser system 100, it is possible to raise the laser output precisely to the desired laser output suited for radiating the laser.

Third Embodiment

Figure 8:
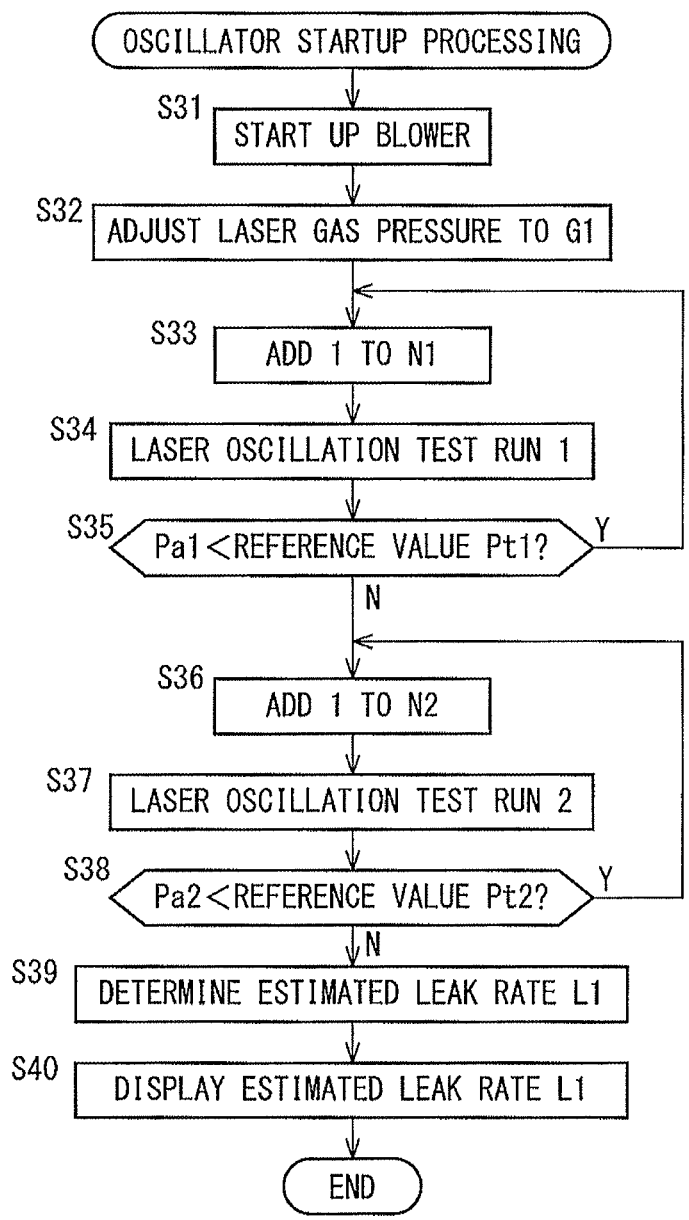
FIG. 8 is a flowchart which shows one example of oscillator startup processing which is executed by a control unit of a laser system according to a third embodiment of the present invention.
Figure 11:
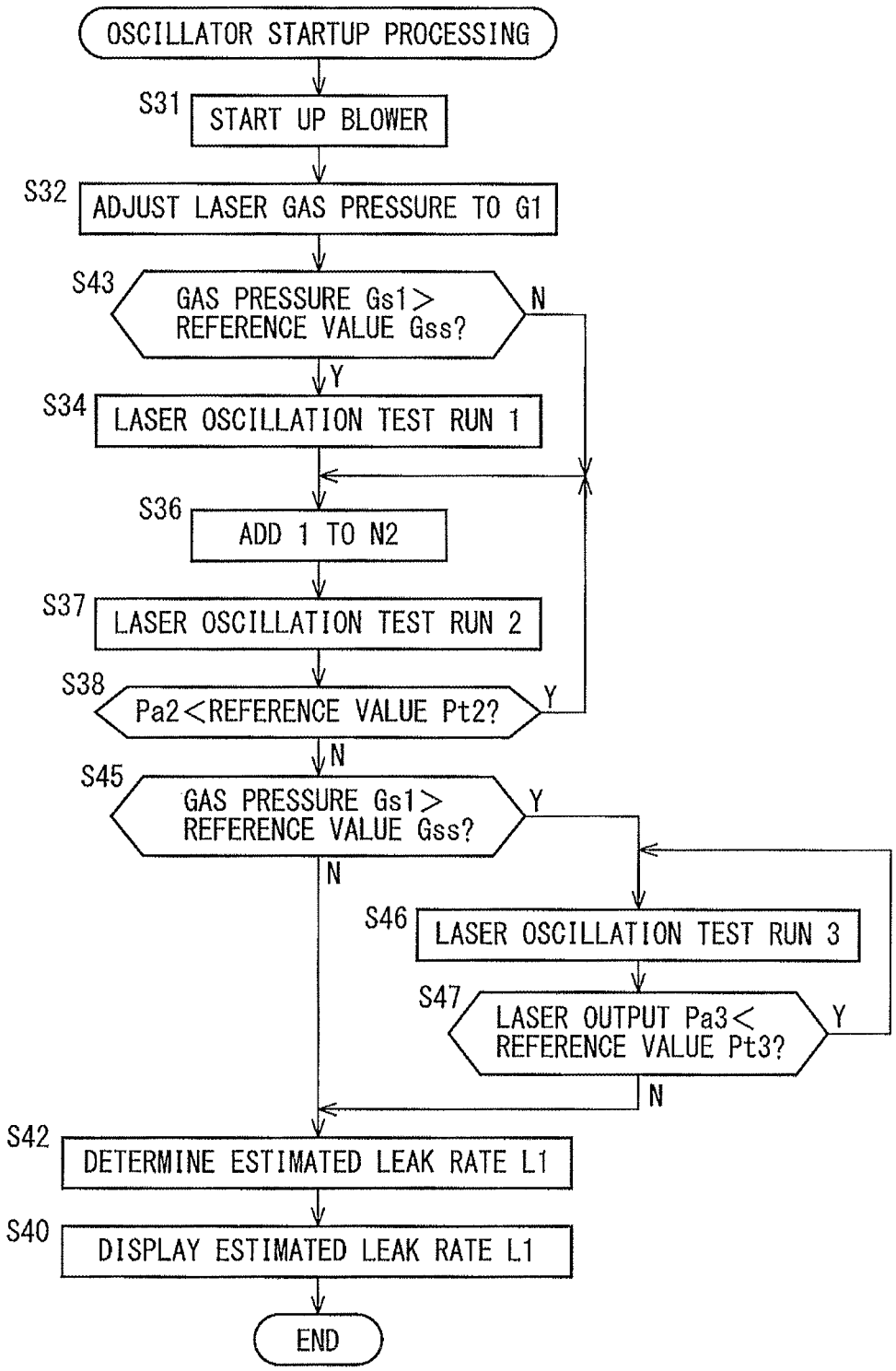
FIG. 11 is a flow chart which shows a modification of FIG. 10.

Referring to FIG. 8 and FIG. 11, a third embodiment of the present invention will be explained. Below, the points of difference from the second embodiment will mainly be explained. The third embodiment differs from the second embodiment in the oscillator startup processing in the control unit 5. Before the oscillator startup processing, oscillator shutdown processing similar to the first embodiment is executed. In the second embodiment, the laser oscillation test run is repeated until the laser output reaches the reference value Pt1. However, in the third embodiment, a plurality of oscillation conditions (first oscillation condition and second oscillation condition) are set and the laser oscillation test run is repeat under the respective oscillation conditions. Below, a laser oscillation test run which corresponds to the first oscillation condition will be referred to as the "laser oscillation test run 1", while a laser oscillation test run which corresponds to the second oscillation condition will be referred to as the "laser oscillation test run 2".

FIG. 8 is a flowchart which shows one example of the oscillator startup processing executed at the control unit 5 of the third embodiment. In FIG. 8, first, at step S31 and step S35, the same processing as step S21 to step S24 of FIG. 6 is executed. That is, as the first initial operation, the laser oscillation test run 1 is repeated in accordance with the first oscillation condition until the laser output Pa1 reaches the reference value Pt1 (first reference value). In the laser oscillation test run 1, the laser oscillation is performed for exactly the predetermined time T1 (first predetermined time) in accordance with the laser output command P1 (first laser output command) and the duty command D1 (first duty command) as pulse commands.

If the laser output Pa1 reaches the first reference value Pt1, the routine proceeds to step S36 where, as a second initial operation, a laser oscillation test run 2 is executed in accordance with the second oscillation condition until the laser output (below, this expressed by Pa2 to differentiate it from the laser output Pa1 of the first initial operation)

reaches the second reference value Pt2. In this case, first, at step S36, the number N2 of times of execution of the laser oscillation test run 2 is incremented by exactly "1". N2 is set to "0" in the initial state. Next, at step S37, the laser oscillation test run 2 is executed in accordance with predetermined second oscillation condition. That is, the laser oscillation is performed for exactly the predetermined time T2 (second predetermined time) in accordance with the laser output command P2 (second laser output command) and the duty command D2 (second duty command) as pulse commands.

The second laser output command P2 is set to a value larger than the first laser output command P1. Due to this, in the laser oscillation test run 2, laser oscillation of a higher output than the laser oscillation test run 1 becomes possible. The second duty command D2 and the second predetermined time t2 are, for example, the same values as the first duty command D1 and first predetermined time T1. At step S38, it is judged if the detected laser output Pa2 is smaller than a predetermined second reference value Pt2. The second reference value Pt2 is set to a value which is larger than the first reference value Pt1. If the positive decision is made at step S38, the routine returns to step S36 where the number N2 of times of execution of the laser oscillation test run 2 is incremented by "1". When the laser output Pa2 reaches the reference value Pt2, the routine proceeds to step S39.

At step S39, the number N1 of times of execution of the laser oscillation test run 1 and the number N2 of times of execution of the laser oscillation test run 2 are used as the basis to determine the estimated leak rate L2. For example, the relationship between the total number of times of execution combining N1 and N2 and the estimated leak rate L1, specifically, the relationship where the greater the total number of times of execution, the larger estimated leak rate L1, is determined in advance by experiments, etc. and stored in the memory. This relationship is used to determine the estimated leak rate L1 corresponding to the numbers N1 and N2 of times of execution. It is also possible to multiply N1 and N2 with respectively different coefficients α and β (for example, α<β), add the multiplied α×N1 and β×N2, and determine the estimated leak rate L1 corresponding to the added value. Next, at step S40, the estimated leak rate L1 is displayed on the display unit 6 and the oscillator startup processing is ended.

In the third embodiment, a plurality of oscillation conditions (first oscillation condition and second oscillation condition) are used to successively execute laser oscillation test runs (laser oscillation test run 1 and laser oscillation test run 2) and the numbers N1 and N2 of times of execution of the laser oscillation test runs are used as the basis to determine the estimated leak rate L1. Due to this, in the same way as the first and second embodiments, it is possible to easily and accurately obtain a grasp of the extent of the hermetic seal of the laser gas container 1 and possible to keep down the rise in price of the laser system 100. Further, along with the progress in the laser oscillation test runs from the laser oscillation test run 1 to the laser oscillation test run 2, the laser output command is made larger (Pa1<Pa2), so it is possible to prevent abnormal discharge at the time of oscillator startup processing.

That is, when a large amount of air enters the laser gas container 1, if using a high laser output command to execute a laser oscillation test run, abnormal discharge occurs and the discharge tube is liable to break, etc. On this point, in the third embodiment, first, a low laser output command is used to execute a laser oscillation test run (laser oscillation test run 1), so it is possible to remove a certain extent of the moisture in the air which entered the laser gas in the initial state and reduce the ratio of contamination by impurities. Therefore, after that, when raising the laser output command to execute the laser oscillation test run (laser oscillation test run 2), it is possible to prevent abnormal discharge from occurring.

Figure 9:
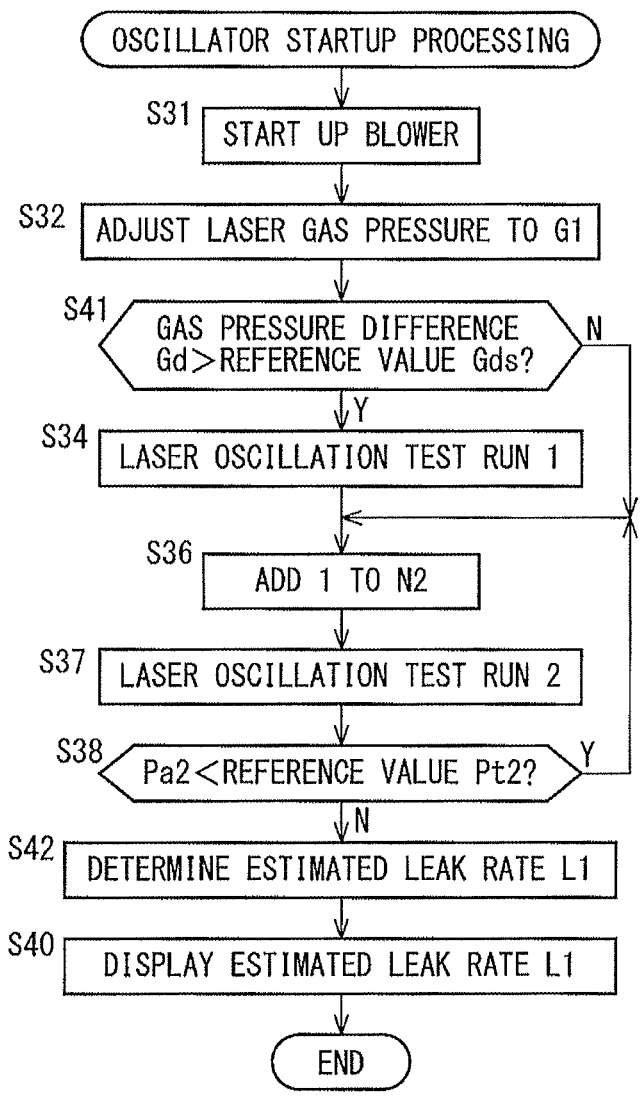
FIG. 9 is a flow chart which shows a modification of FIG. 8.

FIG. 9 is a flow chart which shows a modification of FIG. 8. The same portions as shown in FIG. 8 are assigned the same reference notations. In FIG. 9, in accordance with the state of the laser gas, the first initial operation is omitted. In executing the processing of FIG. 9, when a command for turning off the power of the laser oscillator 2 is output, the detection value GsO of the gas pressure before the power of the laser oscillator 2 is turned off is stored in advance in the memory as the gas pressure at the time of the previous laser operation. After that, when turning the power of the laser oscillator 2 on is commanded, the pressure difference Gd (=Gs1−Gs0) between the detection value Gs1 of the gas pressure immediately after that (gas pressure before start of startup processing) and Gs0, that is, the gas pressure difference Gd, is stored in the memory. In this state, the oscillator startup processing of FIG. 9 is executed.

In this case, first, the blower 3 is started up (step S31), and the gas pressure is adjusted to a predetermined gas pressure G1 (step S32). Next, at step S41, it is judged if the gas pressure difference Gd is larger than a predetermined reference value Gds of the gas pressure difference. The reference value Gds is a threshold value for judging whether to perform the first initial operation. That is, when the gas pressure difference Gd is large, it is believed that the laser gas will be contaminated by a large amount of air, so the need for the first initial operation is judged in accordance with the gas pressure difference Gd. When the positive decision is made at step S41, the routine proceeds to step S34, while when the negative decision is made, the routine bypasses step S34 and proceeds to step S36

At step S34, the laser oscillation test run 1 is executed under the first oscillation condition and the routine proceeds to step S36. Due to this, when the gas pressure difference Gd is large, a small laser output command P1 is used to execute the laser oscillation test run 1, so it is possible to prevent abnormal discharge at the time of the laser oscillation test run. On the other hand, when the gas pressure difference Gd is small, the laser oscillation test run 1 is omitted, so an efficient laser oscillation test run can be performed.

After this, at step S36 to step S38, the laser oscillation test run 2 is repeated until the laser output Pa2 becomes the second reference value Pt2. Next, at step S42, the number N2 of times of execution of the laser oscillation test run 2 is used to determine the estimated leak rate L1 of the laser oscillator 2. In this case, the relationship that the larger the number N2 of times of execution, the larger the estimated leak rate L1, is determined in advance by experiments, etc. and is stored in the memory. This relationship is used to determine the estimated leak rate L1. In FIG. 9, when Gd>Gds, the laser oscillation test run 1 is executed exactly one time. However, the laser oscillation test run 1 may also be repeated until the gas pressure difference Gd reaches the reference value Gds. In this case, at step S42, in the same way as step S39 of FIG. 8, the numbers N1 and N2 of times of execution of the laser oscillation test run 1 and the laser oscillation test run 2 may be used to determine the estimated leak rate L1.

Figure 10:
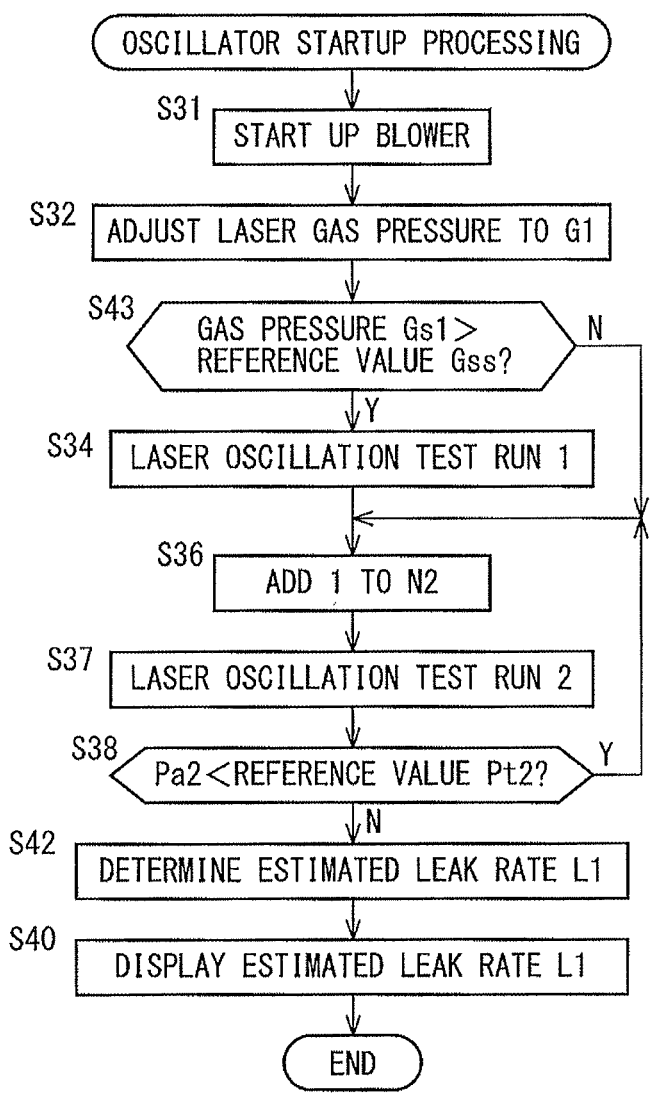
FIG. 10 is a flow chart which shows a modification of FIG. 9.

If the laser gas is contaminated by a large amount of air, the gas pressure before startup of the laser oscillator becomes larger. Therefore, instead of using the gas pressure difference Gd, it is possible to determine the need for the first initial operation by using the gas pressure Gs1 after turning on the laser oscillator 2 is commanded and before the laser radiation is commanded, that is, at the time of startup of the laser oscillator 2. FIG. 10 is a flowchart which shows one example of the processing in this case. The same portions as shown in FIG. 9 are assigned the same reference notations.

In FIG. 10, instead of step S41 of FIG. 9, at step S43, it is determined if the gas pressure Gs1 is larger than a predetermined reference value Gss. The reference value Gss is a threshold value for judging whether to perform the first initial operation. If the positive decision is made at step S43, the routine proceeds to step S34 where the first initial operation is performed. Due to this, when the gas pressure Gs1 is large, a small laser output command P1 is used to execute the laser oscillation test run 1, so it is possible to prevent abnormal discharge at the time of the laser oscillation test run.

In this regard, if the laser radiation is commanded after the end of the oscillator startup processing, the control unit 5 performs control which uses the error between the laser output value and the laser output command as the basis to increase or decrease the power supplied to the laser power source 24, that is, feedback control. Therefore, by effectively utilizing feedback and confirming the laser output before the completion of the oscillator startup processing, it is possible to more reliably obtain the desired laser output at the time of a laser radiation command. This point is considered in FIG. 11. FIG. 11 is a modification of FIG. 10. The same portions as shown in FIG. 10 are assigned the same reference notations.

In FIG. 11, if the second initial operation ends, the routine proceeds from step S38 to step S45. At step S45, in the same way as step S43, it is judged if the gas pressure Gs1 is larger than the reference value Gss. If the positive decision is made at step S45, the routine proceeds to step S46, while if the negative decision is made, the routine proceeds to step S42. At step S46, a laser oscillation test run 3 is executed in accordance with a predetermined third oscillation condition. That is, laser oscillation is performed for exactly a predetermined time T3 (third predetermined time) in accordance with the laser output command P3 (third laser output command) and the duty command D3 (third duty command) as pulse commands. The processing of this step S46 is executed after effectively utilizing the feedback to the laser output command. The laser output command P3 is, for example, set to a value larger than the laser output command P2.

Next, at step S47, it is judged if the detected laser output Pa3 is smaller than a predetermined third reference value Pt3. The third reference value Pt3 is, for example, set to a value larger than the second reference value Pt2. If the positive decision is made at step S47, the routine returns to step S46. Due to this, the laser oscillation test run 3 is repeated until the laser output Pa3 reaches the reference value Pt3. If the negative decision is made at step S47, the routine proceeds to step S42.

At FIG. 11, when the gas pressure Gs1 is larger than the reference value Gss, that is, when the laser gas is contaminated by a large amount of air at the time of start of the oscillator startup processing, the feedback is effectively utilized and the laser oscillation test run 3 is executed. This is because it is considered that if the laser gas is contaminated by a large amount of air, the deviation between the laser output command and the laser output becomes larger and the effect of the feedback is high. However, the invention is not limited to this. It is also possible to effectively utilize the feedback after the second initial operation at all times and execute the laser oscillation test run 3.

Fourth Embodiment

Referring to FIG. 12 to FIG. 16, a fourth embodiment of the present invention will be explained. Below, the points of difference from the first embodiment will mainly be explained. In the first embodiment, the estimated leak rate L1 of the laser oscillator 2 is determined from the laser output Pa1 (FIG. 4, step S15). On the other hand, in the fourth embodiment, the leak rate Lc which serves as a reference is determined in advance by another method and the estimated leak rate L1 is determined from the leak rate Lc and the laser output Pa1.

Figure 12:
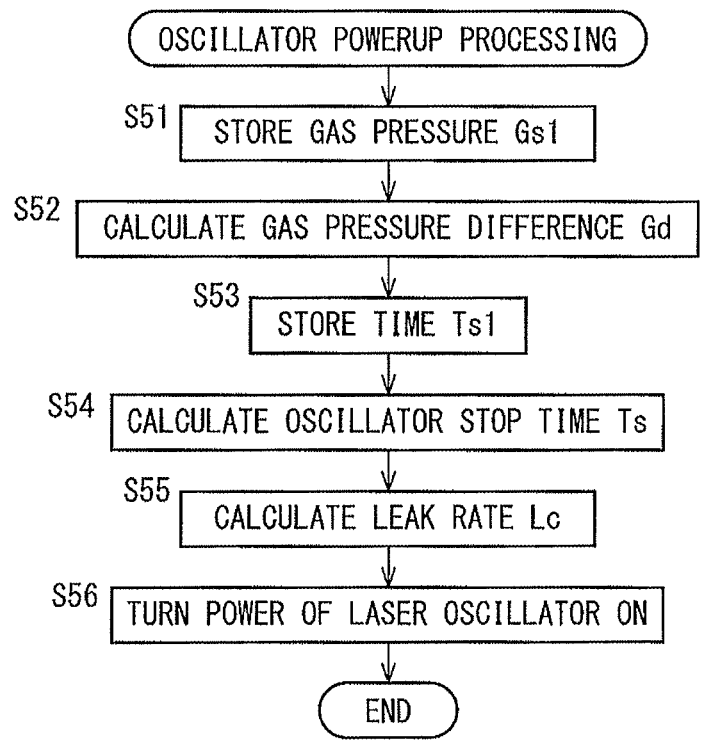
FIG. 12 is a flowchart which shows one example of oscillator powerup processing which is executed by a control unit of a laser system according to a fourth embodiment of the present invention.

When determining the leak rate Lc, the control unit 5 stores the gas pressure Gs0 and time Ts0 when the power of the laser oscillator 2 is instructed to be turned off in the memory. Next, when the power of the laser oscillator 2 is instructed to be turned on, the control unit 5 executes, for example, the processing shown in FIG. 12 (oscillator powerup processing). As shown in FIG. 12, at step S51, the gas pressure Gs1 detected immediately after the start of oscillator powerup processing is stored in the memory. At step S52, the pressure difference between the gas pressure Gs1 and the gas pressure Gs0 at the time of the power source turn-off instruction, that is, the gas pressure difference Gd (=Gs1−Gs0), is calculated. At step S53, the current time Ts1 is stored in the memory.

At step S54, Ts0 is subtracted from Ts1 and the shutdown time Ts of the laser oscillator 2 (oscillator shutdown time) is calculated. At step S55, the gas pressure difference Gd is divided by the oscillator shutdown time Ts to calculate the leak rate Lc (unit: Pa/hour). At step S56, the power of the laser oscillator 2 (laser power source 24) is turned on and the oscillator powerup processing is ended. Due to this, the system becomes ready to start up the laser oscillator 2.

Figure 13:
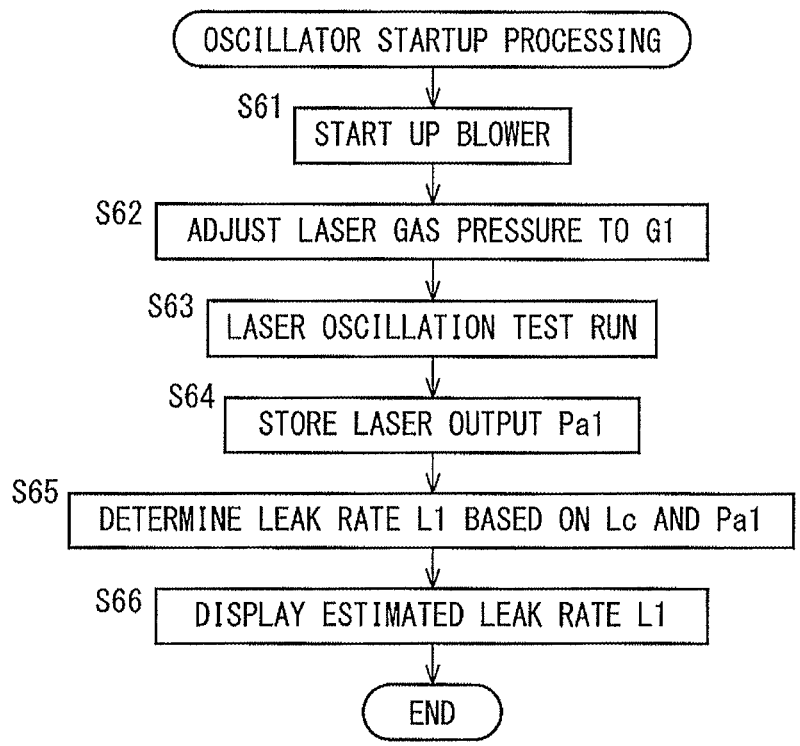
FIG. 13 is a flowchart which shows one example of oscillator startup processing which is executed by a control unit of a laser system according to a fourth embodiment of the present invention.

FIG. 13 is a flowchart which shows one example of oscillator startup processing according to a fourth embodiment. The processing of FIG. 13 is started when the oscillator powerup processing is ended. At step S61 to step S64, the same processing as step S11 to step S14 of FIG. 4 is executed. That is, at step S61, the blower 3 is started up, at step S62, the laser gas pressure is adjusted to a predetermined value G1, at step S63, the laser oscillation test run is executed, and at step S64, the laser output Pa1 at that time is stored in the memory.

Next, at step S65, the leak rate Lc which is calculated by the oscillator powerup processing and the laser output Pa1 are used as the basis to determine the estimated leak rate L1. For example, in the same way as at step S15 of FIG. 4, a leak rate is determined from the laser output Pa1, and the average value of the determined leak rate and the leak rate Lc is calculated as the estimated leak rate. At step S66, the estimated leak rate L1 is displayed on the display unit 6 and the oscillator startup processing is ended.

At the fourth embodiment, the gas pressure difference Gd which is measured during the shutdown time of the laser oscillator 2 is divided by the shutdown time Ts to calculate the reference leak rate Lc, then this leak rate Lc and laser output Pa1 are used to calculate the estimated leak rate L1. Due to this, the leak rate Lc determined by simple calculation can be corrected by the leak rate based on the laser output, so a more accurate estimated leak rate L1 can be determined.

At step S55, instead of using the gas pressure difference Gd and oscillator shutdown time Ts to determine the leak rate Lc, it is also possible to determine the leak rate Lc from the gas pressure Gs1 before startup of the laser oscillator 2 and the oscillator shutdown time Ts and, at step S65, calculate the estimated leak rate L1 from this leak rate Lc and laser output Pa1. Instead of displaying the estimated leak rate L1, it is also possible to use the estimated leak rate L1 as the basis to judge the quality of the hermetic seal of the laser gas container 1 and display a warning.

Figure 14:
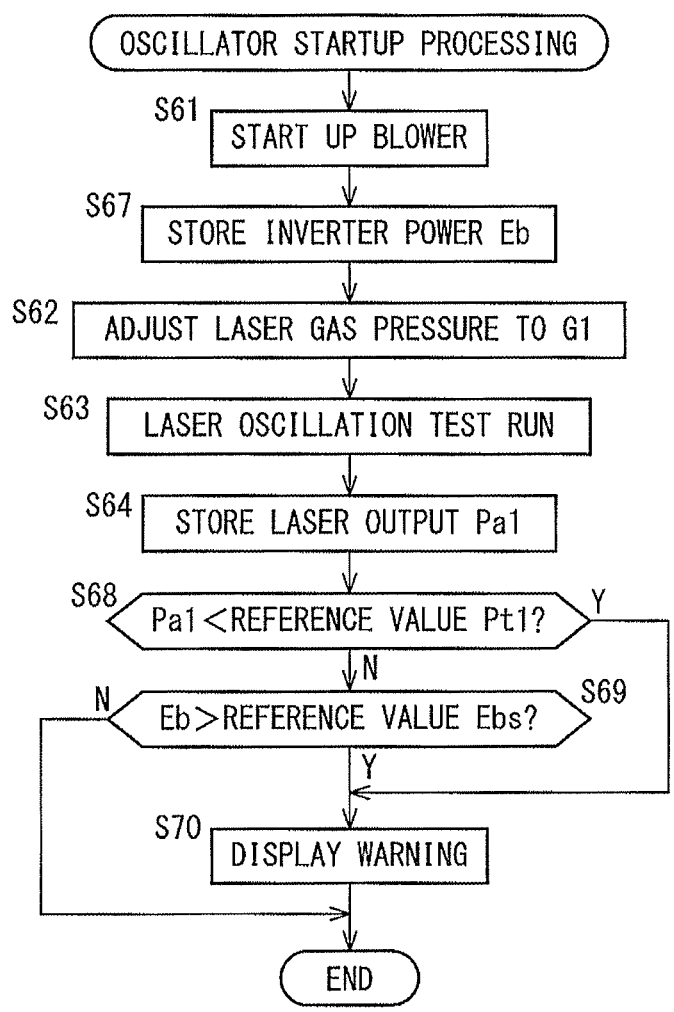
FIG. 14 is a flow chart which shows a modification of FIG. 13.

Rather than the gas pressure difference Gd or gas pressure Gs1, another physical quantity may be monitored to determine the estimated leak rate L1 or judge the quality of the hermetic seal. FIG. 14 is a flowchart which shows a modification of FIG. 13. The same portions as shown in FIG. 13 are assigned the same reference notations. In FIG. 14, if the hermetic seal of the laser gas container 1 is poor, the inverter power of the blower 3 becomes larger. The inverter power is monitored considering this point. In FIG. 14, the quality of the hermetic seal is judged without using the oscillator shutdown time Ts, so the oscillator powerup processing of FIG. 12 is not executed before the start of oscillator startup processing.

At FIG. 14, at step S61, the blower 3 is started up, then, at step S67, the power Eb of the inverter for driving the blower is stored in the memory. The inverter power Eb can be acquired by the control unit 5 (laser control unit 52 of FIG. 2). Next, at step S62, the laser gas pressure is adjusted to a predetermined value G1, at step S63, a laser oscillation test run is executed, at step S64, the laser output Pa1 is stored in the memory, then, at step S68, in the same way as step S17 of FIG. 5, it is judged if the laser output Pa1 is smaller than the reference value Pt1.

If the negative decision is made at step S68, the routine proceeds to step S69, while if the positive decision is made, the routine bypasses step S69 and proceeds to step S70. At step S69, it is judged if the inverter power Eb is larger than a predetermined reference value Ebs. The reference value Ebs is the threshold value for judging the quality of the hermetic seal and is a value which is determined in advance by experiments, etc. If the positive decision is made at step S69, the routine proceeds to step S70, while if the negative decision is made, the routine passes step S70 and ends the processing. At step S70, the display unit 6 displays a warning to indicate the effect that the hermetic seal of the laser gas container 1 is poor.

In the example of FIG. 14, when the laser output Pa1 is smaller than the reference value Pt1 or when the inverter power Eb of the blower 3 is larger than the reference value Ebs, a warning is displayed. For this reasons, it is possible to judge the quality of the hermetic seal of the laser gas container 1 more reliably. Instead of judging the quality of the hermetic seal, it is also possible to determine the estimated leak rate L1 and display it. In this case, for example, it is also possible to determine and store the relationship between the inverter power Eb and the leak rate in advance by experiments, etc., calculate the leak rate which corresponds to the inverter power Eb from this relationship, and define the average value of this leak rate and the leak rate determined from the laser output Pa1 as the estimated leak rate L1.

Figure 15:
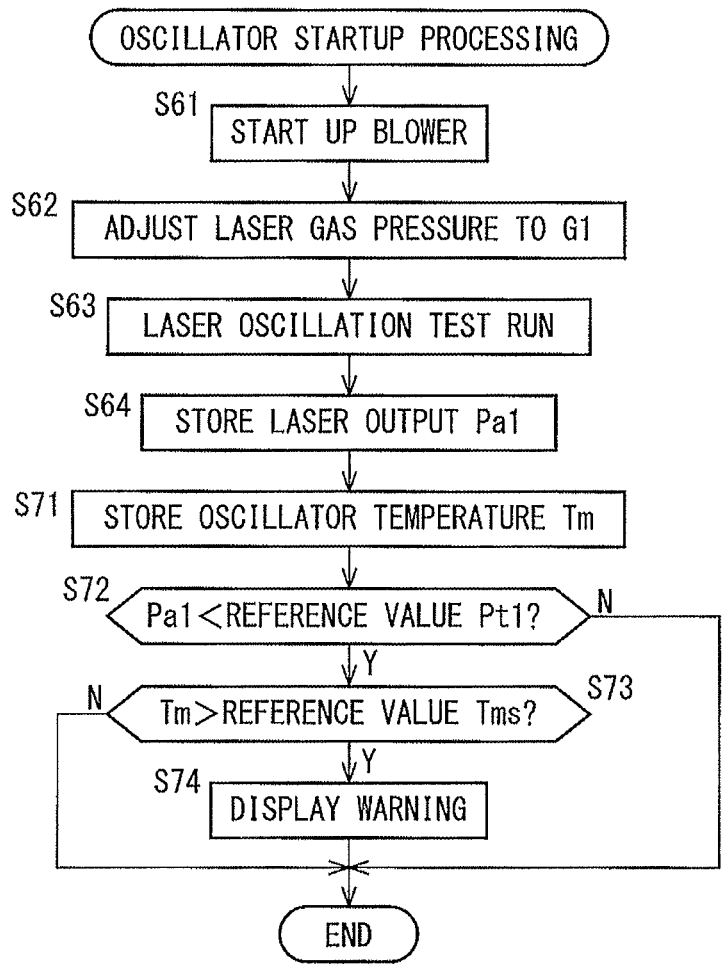
FIG. 15 is a flow chart which shows another modification of FIG. 13.

FIG. 15 is another flow chart which shows a modification of FIG. 13. The same portions as shown in FIG. 13 are assigned the same reference notations. In FIG. 15, if the temperature (oscillator temperature) of the laser oscillator 2 is low, the laser output becomes lower. Considering this point, the oscillator temperature is monitored. That is, even if there is no problem in the hermetic seal, the laser output sometimes becomes low due to lowness of the oscillator temperature Tm. In this case, mistaken judgment of the hermetic seal being poor is prevented in the example of FIG. 15. In FIG. 15 as well, the quality of the hermetic seal is judged without using the oscillator shutdown time Ts, so the oscillator powerup processing of FIG. 12 is not executed before the start of the oscillator startup processing.

Figure 16:
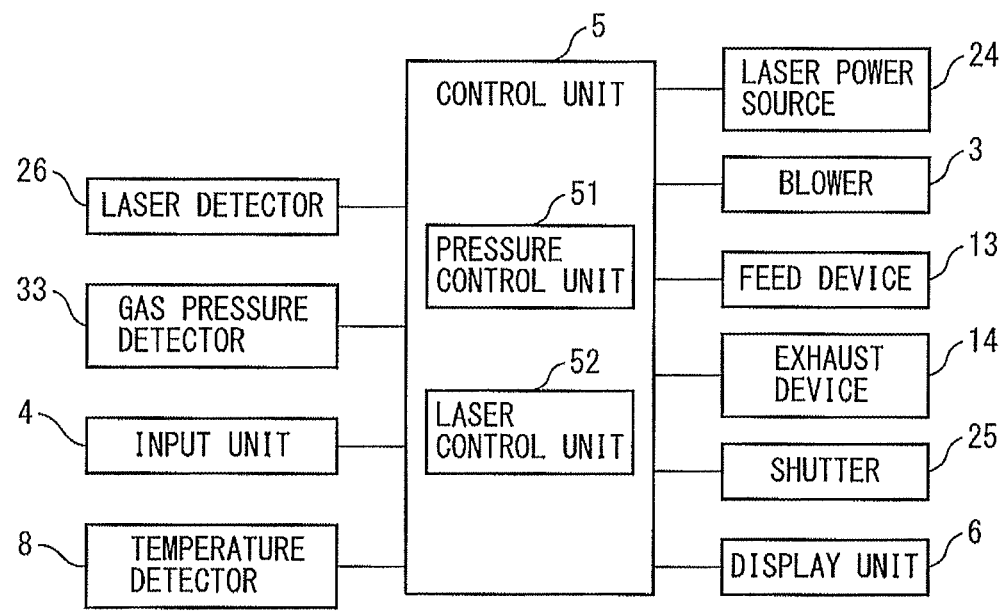
FIG. 16 is a block diagram which shows the control configuration of a laser system which corresponds to the processing of FIG. 15.

FIG. 16 is a block diagram of a laser system 100 which corresponds to the processing of FIG. 15. As shown in FIG. 16, the control unit 5 is connected to a temperature detector 8 which detects the temperature of the laser oscillator 2. It is possible to use a temperature switch or other temperature detector instead of a temperature detector 8.

In FIG. 15, at step S64, if storing the laser output Pa1 at the time of the laser oscillation test run, the routine proceeds to step S71 where the oscillator temperature Tm which is detected by the temperature detector 7 is stored in the memory. At step S72, it is judged if the laser output Pa1 is smaller than the reference value Pt1. If the positive decision is made, the routine proceeds to step S73. At step S73, it is judged if the oscillator temperature Tm is higher than a predetermined reference value Tms. The reference value Tms is a threshold value for judging if it is possible to effectively judge the quality of the hermetic seal and can be determined in advance by experiments, etc.

If the positive decision is made at step S73, the routine proceeds to step S74 where the display unit 6 displays a warning. If the negative decision is made at step S73, the routine bypasses step S74 and ends the processing. Due to this, when the oscillator temperature Tm is low (Tm≤Tms), even when the laser output Pa1 is smaller than the reference value Pt1, no warning is displayed, so it is possible to prevent the quality of the hermetic seal from being mistakenly judged.

Modification

In the above embodiments, a gas pressure detector 33 is provided at the downstream side of the first heat exchanger 31 and the upstream side of the blower 30. However, so long as detecting the laser gas pressure inside of the laser gas container 1, the gas pressure detector may be provided at another position as well. Although the laser gas pressure is adjusted to a predetermined value G1 by controlling the feed device 13 and exhaust device 14 based on a value detected by the gas pressure detector 33, the pressure adjusting part is not limited to this. If controlling the pressure adjusting part so that before startup of the laser oscillator 2, the laser gas pressure becomes the target gas pressure G0 (first gas pressure) lower than the atmospheric pressure and so that at the preparatory stage after startup of the laser oscillator 2 and before radiation of the laser light, the laser gas pressure becomes a predetermined value G1 (second gas pressure) enabling oscillating laser light, the pressure control unit 51 can be configured in any way.

If controlling the laser oscillator 2 so as to execute an initial operation (laser oscillation test run) where, at the preparatory stage, the laser oscillator 2 outputs laser light in accordance with the predetermined oscillation condition, the laser control unit 52 can be configured in any way. If estimating an extent of hermetic seal of the laser gas container 1 based on the detection value Pa1 obtained by the laser detector 26 as the laser detector, the control unit 5 serving as the hermetic seal estimating part can be configured in any way.

In the above embodiments (FIG. 4), the estimated leak rate L1 is determined by using the laser output Pa1 detected at the time of the laser oscillation test run. However, it is also possible to use another physical quantity which has a correlative relationship with the laser output Pa1 (for example, the current, voltage, power, etc. of the laser power source 24) to calculate the estimated leak rate L1. Therefore, the laser detector may also be configured by other than the laser detector 26. In the above embodiments (FIG. 6), the extent of the hermetic seal of the laser gas container 1 is estimated in accordance with the number N1 of times of execution of the laser oscillation test run. However, it is also possible to estimate it in accordance with the time of execution of the laser oscillation test run (total time).

In the above embodiments (FIG. 7), the laser output Pa1 detected at the time of the end of the initial operation is stored in the memory of the control unit 5 serving as the laser output memory unit, and this stored value Pp (=Pa1) is used to set the reference value Pt1 (predetermined value) at the time of the laser oscillation test run. However, the method of setting the predetermined value is not limited to this. In the above embodiments (FIG. 5), the detected laser output Pa1 and threshold value Pt1 are compared to judge the quality of the hermetic seal. However, it is also possible to repeat the laser oscillation test run until the laser output Pa1 becomes a predetermined value Pt1 and compare the number of times or time the laser oscillation test run executed at that time with a threshold value to judge the quality of the hermetic seal.

In the above embodiments (FIG. 8), a laser oscillation test run 1 which outputs laser light in accordance with first oscillation condition (first initial operation) and a laser oscillation test run 2 which outputs laser light in accordance with second oscillation condition (second initial operation) are executed. However, it is also possible to set more oscillation conditions to execute laser oscillation test runs. In this case, it is sufficient to set the oscillation conditions so as to gradually increase the laser output command along with the progress in the laser oscillation test runs. At step S39 of FIG. 8, in the same way as FIG. 9 to FIG. 11, the detection value Pa2 of the laser light which is output by the second initial operation may be used as the basis to determine the estimated leak rate L1.

In the above embodiments (FIG. 9), the detection value GsO of the gas pressure when the command for turning off the power of the laser oscillator 2 is input is stored in gas pressure memory unit constituted by the memory of the control unit 5. However, the gas pressure memory unit is not limited to this configuration. Although the pressure difference Gd between the gas pressure GsO stored in the gas pressure memory unit and the gas pressure Gs1 detected after startup of the laser oscillator 2 is calculated by the control unit 5, it is also possible to use a differential pressure gauge, etc. to detect the pressure difference Gd. In the above embodiment (FIG. 10), the gas pressure Gs1 detected before the start of the oscillator startup processing of the laser oscillator 2 is stored in the gas pressure memory unit constituted by the memory of the control unit 5. However, the gas pressure memory unit is not limited to this in configuration.

In the above embodiments (FIG. 11), when the gas pressure Gs1 is larger than the reference value Gss, the third initial operation is executed by feedback control in accordance with the third oscillation condition. However, it is also possible to effectively utilize the feedback and execute another initial operation. In the above embodiment (FIG. 12), the time from when the power source of the laser oscillator 2 is turned off to when the startup of the laser oscillator 2 is started (oscillator shutdown time Ts) is calculated by the control unit 5. However, the shutdown time calculating part is not limited to this configuration. Although the leak rate Lc calculated using the oscillator shutdown time Ts and the leak rate determined from the laser output Pa1 are averaged to determine the estimated leak rate L1, if estimating the extent of hermetic seal based on the oscillator shutdown time Ts and the detected laser output Pa1, the control unit 5 may be configured in any way.

In the above embodiments (FIG. 14), the inverter power Eb of the blower 3 and the reference value Ebs are compared in magnitude to estimate the extent of hermetic seal. However, it is also possible to use another physical quantity which has a correlative relationship with the rotational operation of the blower 3 (for example, the voltage, power, discharge pressure, suction pressure, etc. of the blower 3) to estimate the extent of hermetic seal. In this case, it is also possible to use a plurality of physical quantities which have correlative relationships with rotational operation of the blower 3 to estimate the extent of hermetic seal. In the above embodiments (FIG. 15), the temperature Tm of the laser oscillator 2 is detected by the temperature detector 8. However, it is also possible to detect another physical quantity which has a correlative relationship with the laser gas temperature in the laser gas container 1 and estimate the extent of the hermetic seal based on this detection value and the laser output Pa1.

The above embodiments may be combined with one or more of the above modifications.

According to the present invention, before startup of the laser oscillator, the gas pressure in a laser gas, container is made lower than atmospheric pressure, and at the time of startup of the laser oscillator, the extent of the hermetic seal of the laser gas container is estimated based on the detection value of the laser output. Therefore, it is possible to easily and accurately estimate the extent of the hermetic seal of the laser gas container.

Above, the present invention was explained in relation to preferred embodiments, but a person skilled in the art would understand that various corrections and changes may be made without departing from the scope of disclosure of the later set forth claims.

The invention claimed is:
1. A laser system comprising:
a laser gas container forming a gas channel through which laser gas circulates,
a laser oscillator oscillating laser light by using laser gas flowing through the gas channel as an excitation medium,
a gas pressure detector detecting a laser gas pressure in the laser gas container,
a pressure adjusting part adjusting the laser gas pressure in the laser gas container based on a value detected by the gas pressure detector,
a pressure control unit controlling the pressure adjusting part so that when shutdown of the laser oscillator is instructed, the laser gas pressure in the laser gas container becomes a first gas pressure lower than atmospheric pressure and so that at a preparatory stage after startup of the laser oscillator and before radiation of the laser light to an outside, the laser gas pressure in the laser gas container becomes a second gas pressure capable of oscillating laser light,
a laser control unit controlling the laser oscillator so that the laser oscillator executes an initial operation in which the laser oscillator outputs laser light in accordance with a predetermined oscillation condition at the preparatory stage,
a laser detector detecting an output of the laser light in the initial operation of the laser oscillator or a physical quantity having a correlative relationship with the output of the laser light in the initial operation of the laser oscillator, and a hermetic seal estimating part estimating an extent of leakage in the hermetic seal of the laser gas container based on a detection value obtained by the laser detector.

2. The laser system according to claim 1, wherein the laser control unit controls the laser oscillator so as to execute the initial operation until a detection value detected by the laser detector reaches a predetermined value, and the hermetic seal estimating part estimates the extent of hermetic seal of the laser gas container in accordance with number of times or time of execution of the initial operation.

3. The laser system according to claim 2, further comprising a laser output memory unit storing a detection value obtained by the laser detector at an end of the initial operation, wherein the predetermined value is set in advance based on the detection value stored in the laser output memory unit.

4. The laser system according to claim 1, wherein the hermetic seal estimating part compares the detection value obtained by the laser detector or the number of times or time of execution of the initial operation with a predetermined threshold value to judge a quality of hermetic seal of the laser gas container.

5. The laser system according to claim 1, wherein the initial operation includes a first initial operation outputting laser light in accordance with a first oscillation condition including a command of a first laser output and a second initial operation outputting laser light in accordance with a second oscillation condition including a command of a second laser output larger than the first laser output, the laser control unit controls the laser oscillator to execute the first initial operation, then execute the second initial operation at the preparatory stage, and the hermetic seal estimating part estimates the extent of hermetic seal of the laser gas container based on at least a detection value of the laser light output by the second initial operation.

6. The laser system according to claim 5, further comprising a gas pressure memory unit storing a laser gas pressure detected by the gas pressure detector when a command for turning off power of the laser oscillator is input, wherein the laser control unit controls the laser oscillator so as to not execute the first initial operation, but execute the second initial operation when a pressure difference between the laser gas pressure stored in the gas pressure memory unit and a laser gas pressure detected by the gas pressure detector after startup of the laser oscillator is equal to or less than a predetermined value.

7. The laser system according to claim 5, further comprising a gas pressure memory unit storing a laser gas pressure detected by the gas pressure detector before startup of the laser oscillator, and wherein the laser control unit controls the laser oscillator so as to not execute the first initial operation, but execute the second initial operation when the laser gas pressure stored by the gas pressure memory unit is equal to or less than a predetermined value.

8. The laser system according to claim 6, wherein the laser control unit controls the laser oscillator so as to execute the second initial operation, then further execute a third initial operation outputting laser light in accordance with a third oscillation condition including a command of a third laser output by feedback control when the pressure difference between the laser gas pressure stored in the gas pressure memory unit and the laser gas pressure detected by the gas pressure detector after startup of the laser oscillator is larger than the predetermined value.

9. The laser system according to claim 7, wherein the laser control unit controls the laser oscillator so as to execute the second initial operation, then further execute a third initial operation outputting laser light in accordance with a third oscillation condition including a command of a third laser output by feedback control when the laser gas pressure stored by the gas pressure memory unit is larger than the predetermined value.

10. The laser system according to claim 1, further comprising a shutdown time calculating part calculating an oscillator shutdown time from when power of the laser oscillator is turned off to when startup of the laser oscillator is started, wherein the hermetic seal estimating part estimates the extent of hermetic seal of the laser gas container based on the detection value obtained by the laser detector and the oscillator shutdown time calculated by the shutdown time calculating part.

11. The laser system according to claim 1, further comprising a blower circulating laser gas through an inside of the laser gas container, wherein the hermetic seal estimating part estimates the extent of hermetic seal of the laser gas container based on the detection value obtained by the laser detector and a physical quantity having a correlative relationship with rotational operation of the blower.

12. The laser system according to claim 1, further comprising a temperature detector detecting a physical quantity having a correlative relationship with a laser gas temperature in the laser gas container, wherein the hermetic seal estimating part estimates the extent of hermetic seal of the laser gas container based on the detection value obtained by the laser detector and the physical quantity detected by the temperature detector.

* * * * *